US012596482B2

(12) United States Patent　　　(10) Patent No.:　US 12,596,482 B2
Alkalay et al.　　　　　　　　　　(45) Date of Patent:　　　Apr. 7, 2026

(54) LOG MEMORY COMPRESSION SYSTEM AND METHOD

(71) Applicant: Dell Products L.P., Round Rock, TX (US)

(72) Inventors: Amitai Alkalay, Kadima (IL); Vladimir Shveidel, Pardes-Hana (IL); Lior Kamran, Rishon LeZion (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/156,730

(22) Filed: Jan. 19, 2023

(65) Prior Publication Data

US 2024/0248607 A1　　Jul. 25, 2024

(51) Int. Cl.
*G06F 12/00*　　　(2006.01)
*G06F 3/06*　　　(2006.01)
*G06F 12/0802*　　(2016.01)

(52) U.S. Cl.
CPC .......... *G06F 3/0613* (2013.01); *G06F 3/0653* (2013.01); *G06F 3/0659* (2013.01); *G06F 3/067* (2013.01); *G06F 12/0802* (2013.01); *G06F 2212/1016* (2013.01)

(58) Field of Classification Search
CPC .... G06F 3/0611; G06F 3/0613; G06F 3/0619; G06F 3/0622; G06F 3/0653
USPC ......................................................... 711/154
See application file for complete search history.

(56) References Cited

U.S. PATENT DOCUMENTS

| | | | | |
|---|---|---|---|---|
| 6,934,735 B1 * | 8/2005 | Emens | .................... | H04L 67/62 |
| | | | | 709/224 |
| 11,625,332 B2 * | 4/2023 | Uhrenholt | ............... | G06F 12/04 |
| | | | | 711/154 |
| 2002/0191692 A1 * | 12/2002 | Fallon | ................. | H03M 7/6094 |
| | | | | 375/240 |
| 2003/0191876 A1 * | 10/2003 | Fallon | ................... | G06F 9/4406 |
| | | | | 710/68 |
| 2014/0282046 A1 * | 9/2014 | Gonsalves | ............ | H04L 67/025 |
| | | | | 715/740 |
| 2015/0019813 A1 * | 1/2015 | Loh | ..................... | G06F 12/0866 |
| | | | | 711/122 |
| 2015/0066880 A1 * | 3/2015 | Chai | ..................... | G06F 16/128 |
| | | | | 707/693 |
| 2016/0127490 A1 * | 5/2016 | Li | .......................... | H04L 69/04 |
| | | | | 709/247 |
| 2018/0302624 A1 * | 10/2018 | Gadelrab | ............... | H04N 19/85 |
| 2020/0153926 A1 * | 5/2020 | Slater | ................. | H03M 7/6088 |
| 2022/0164229 A1 * | 5/2022 | Sahasranamam | ..... | G06F 9/5027 |
| 2022/0398084 A1 * | 12/2022 | Chen | ........................ | G06F 8/65 |

* cited by examiner

*Primary Examiner* — Mohamed M Gebril
(74) *Attorney, Agent, or Firm* — Brian J. Colandreo; Heath M. Sargeant; Holland & Knight LLP

(57)　　　　　ABSTRACT

A method, computer program product, and computing system for processing data to store in a storage system. The data is compressed for storage in a log memory system based upon, at least in part, bandwidth of the storage system. The compressed data is stored in a log memory system. The data is stored in a cache memory system in an uncompressed state.

11 Claims, 6 Drawing Sheets

10

Figure 4:
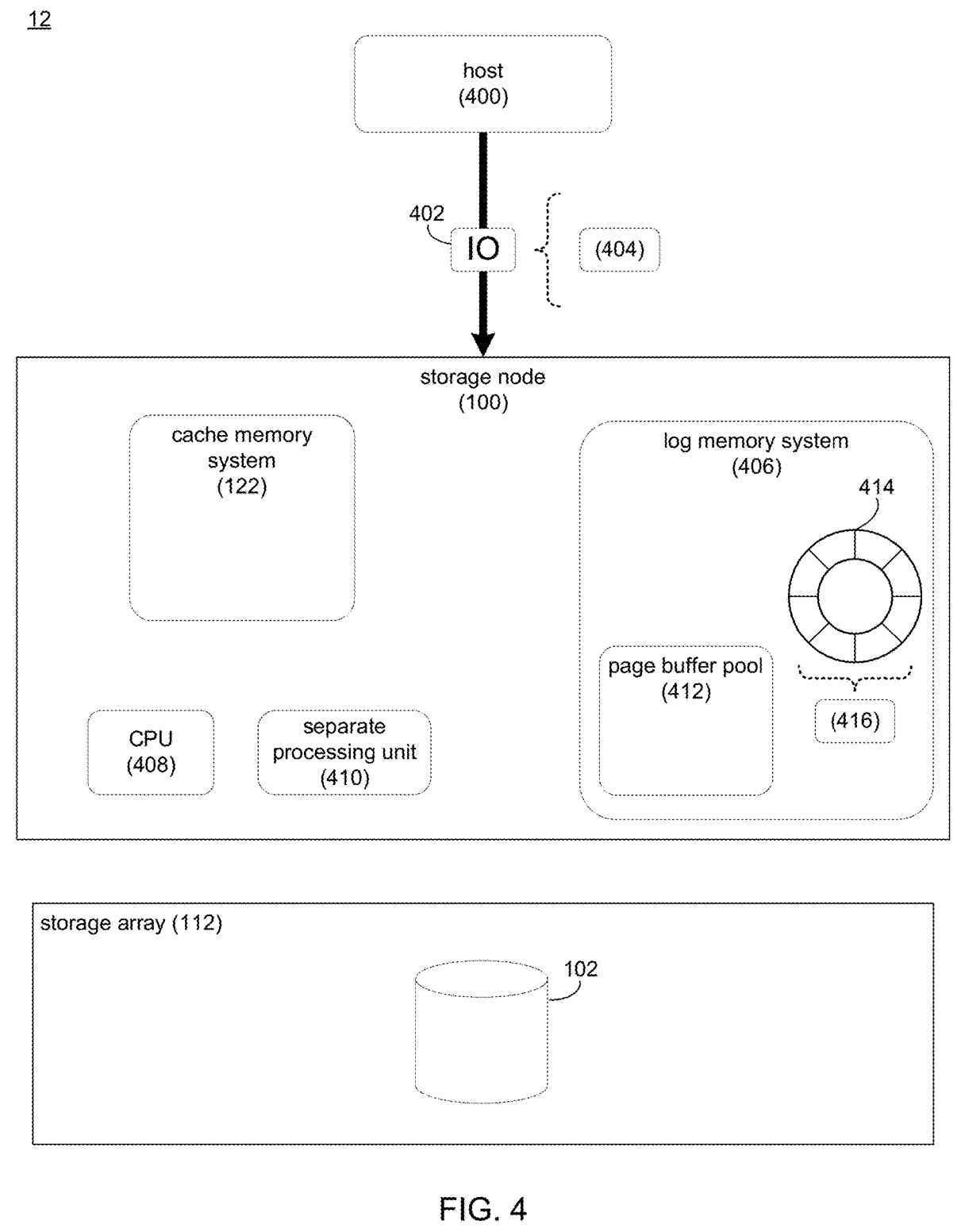

12 host
(400)

402

IO (404)

storage node
(100)

cache memory
system
(122)

CPU
(408)

separate
processing unit
(410)

log memory system
(406)

414 page buffer pool
(412)

(416)

storage array (112)

12 host
(400)

402

IO    (404)

storage node
(100)

cache memory
system
(122)

(404)

(404)

log memory system
(408)

414 separate
processing unit
(410)

CPU
(408)

page buffer pool
(412)

(404')

(416)

storage array (112)

12 host
(400)

402

IO    (404)

storage node
(100)

cache memory
system
(122)

(404)

(404)

CPU
(408)

separate
processing unit
(410)

log memory system
(408)

414 page buffer pool
(412)

(404')

(416)

storage array (112)

102

LOG MEMORY COMPRESSION SYSTEM AND METHOD

BACKGROUND

Storing and safeguarding electronic content may be beneficial in modern business and elsewhere. Accordingly, various methodologies may be employed to protect and distribute such electronic content.

For example, storage system architecture normally persists data related to host write request, prior to acknowledging the request to the host, to prevent data loss in case of HA (High Availability) events and to improve the write request latency. This is normally done by journaling the data and the corresponding metadata to a log memory system, which is an "intermediate" media. Further processing and destaging of the data and metadata to the final storage location is done later in background flush flows. In some cases, storage systems with limited bandwidth to the log memory system, the log memory system becomes a bottleneck, limiting the system performance and causing CPU utilization inefficiencies.

Another challenge is limited flush flow parallelism and utilization. For example, the maximum number of concurrent flushers is limited by the log memory system size, since each "flusher" fills an entire two megabyte physical large blocks with compressed data. As flushers are normally evenly assigned per flush CPU core, the problem becomes even more critical in systems with higher number of CPU cores. As a result, flush flow is not scalable and not able to fully utilize flush CPU cores, causing inefficiencies.

SUMMARY OF DISCLOSURE

In one example implementation, a computer-implemented method executed on a computing device may include, but is not limited to, processing data to store in a storage system. The data is compressed for storage in a log memory system based upon, at least in part, bandwidth of the storage system. The compressed data is stored in a log memory system. The data is stored in a cache memory system in an uncompressed state.

One or more of the following example features may be included. Compressing the data may include comparing the bandwidth of the storage system to a bandwidth threshold. Compressing the data may include, in response to the bandwidth of the storage system being less than or equal to the bandwidth threshold, performing no compression on the data. Compressing the data may include, in response to the bandwidth of the storage system being greater than the bandwidth threshold, compressing the data based upon, at least in part, CPU utilization of the storage system. Compressing the data based upon, at least in part, CPU utilization may include comparing the CPU utilization to a CPU utilization threshold. Compressing the data based upon, at least in part, CPU utilization may include, in response to the CPU utilization being less than or equal to the CPU utilization threshold, compressing the data using a CPU of the storage system. Compressing the data based upon, at least in part, CPU utilization may include, in response to the CPU utilization being greater than the CPU utilization threshold, compressing the data using a separate processing unit.

In another example implementation, a computer program product resides on a computer readable medium that has a plurality of instructions stored on it. When executed by a processor, the instructions cause the processor to perform operations that may include, but are not limited to, processing data to store in a storage system. The data is compressed for storage in a log memory system based upon, at least in part, bandwidth of the storage system. The compressed data is stored in a log memory system. The data is stored in a cache memory system in an uncompressed state.

One or more of the following example features may be included. Compressing the data may include comparing the bandwidth of the storage system to a bandwidth threshold. Compressing the data may include, in response to the bandwidth of the storage system being less than or equal to the bandwidth threshold, performing no compression on the data. Compressing the data may include, in response to the bandwidth of the storage system being greater than the bandwidth threshold, compressing the data based upon, at least in part, CPU utilization of the storage system. Compressing the data based upon, at least in part, CPU utilization may include comparing the CPU utilization to a CPU utilization threshold. Compressing the data based upon, at least in part, CPU utilization may include, in response to the CPU utilization being less than or equal to the CPU utilization threshold, compressing the data using a CPU of the storage system. Compressing the data based upon, at least in part, CPU utilization may include, in response to the CPU utilization being greater than the CPU utilization threshold, compressing the data using a separate processing unit.

In another example implementation, a computing system includes at least one processor and at least one memory architecture coupled with the at least one processor, wherein the at least one processor configured to process data to store in a storage system. The data is compressed for storage in a log memory system based upon, at least in part, bandwidth of the storage system. The compressed data is stored in a log memory system. The data is stored in a cache memory system in an uncompressed state.

One or more of the following example features may be included. Compressing the data may include comparing the bandwidth of the storage system to a bandwidth threshold. Compressing the data may include, in response to the bandwidth of the storage system being less than or equal to the bandwidth threshold, performing no compression on the data. Compressing the data may include, in response to the bandwidth of the storage system being greater than the bandwidth threshold, compressing the data based upon, at least in part, CPU utilization of the storage system. Compressing the data based upon, at least in part, CPU utilization may include comparing the CPU utilization to a CPU utilization threshold. Compressing the data based upon, at least in part, CPU utilization may include, in response to the CPU utilization being less than or equal to the CPU utilization threshold, compressing the data using a CPU of the storage system. Compressing the data based upon, at least in part, CPU utilization may include, in response to the CPU utilization being greater than the CPU utilization threshold, compressing the data using a separate processing unit.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIGS. 4-6 are example diagrammatic views of the storage system of FIG. 1 according to various example implementations of the disclosure.

Like reference symbols in the various drawings indicate like elements.

DETAILED DESCRIPTION

System Overview

Figure 1:
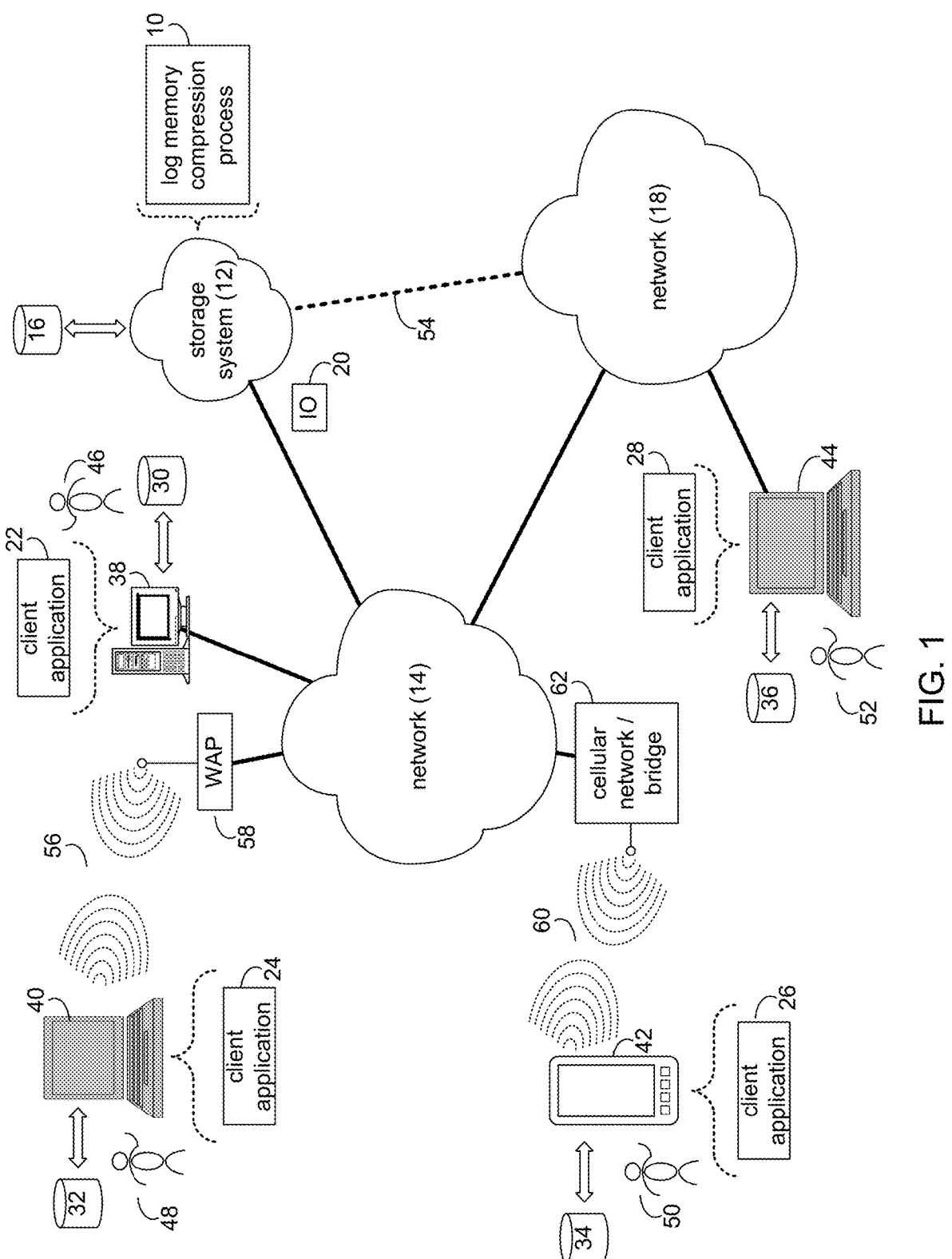
FIG. 1 is an example diagrammatic view of a storage system and a log memory compression process coupled to a distributed computing network according to one or more example implementations of the disclosure.

Referring to FIG. 1, there is shown log memory compression process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of log memory compression process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of log memory compression process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a log memory compression process, such as log memory compression process 10 of FIG. 1, may include but is not limited to, processing data to store in a storage system. The data is compressed for storage in a log memory system based upon, at least in part, bandwidth of the storage system. The compressed data is stored in a log memory system. The data is stored in a cache memory system in an uncompressed state.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
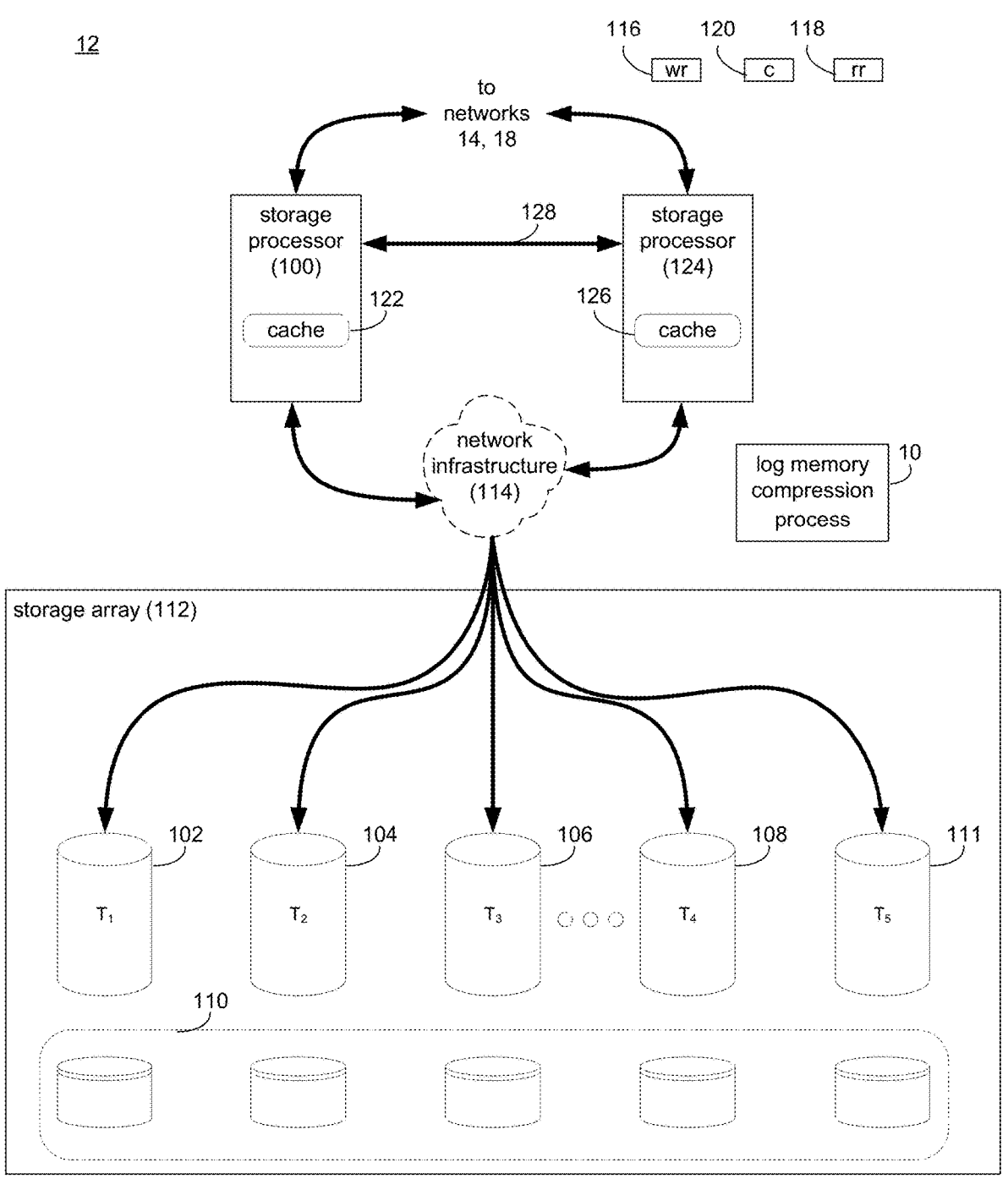
FIG. 2 is an example diagrammatic view of the storage system of FIG. 1 according to one or more example implementations of the disclosure.
Figure 3:
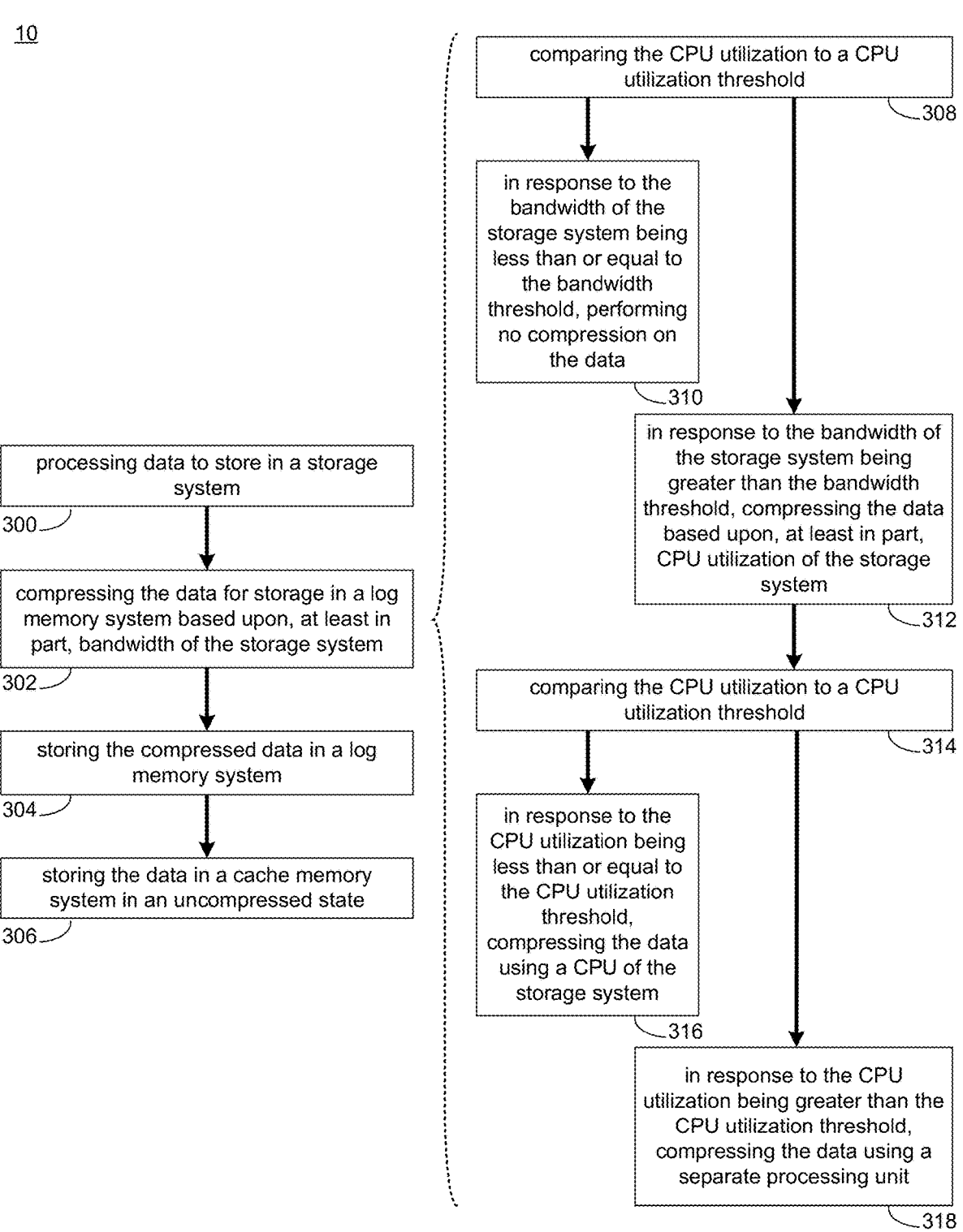
FIG. 3 is an example flowchart of log memory compression process according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of log memory compression process 10. The instruction sets and subroutines of log memory compression process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of log memory compression process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of log memory compression process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of log memory compression process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Log Memory Compression Process

Referring also to the examples of FIGS. 3-6 and in some implementations, log memory compression process 10 may process 300 data to store in a storage system. The data is compressed 302 for storage in a log memory system based upon, at least in part, bandwidth of the storage system. The compressed data is stored 304 in a log memory system. The data is stored 306 in a cache memory system in an uncompressed state.

As will be discussed in greater detail below, implementations of the present disclosure may allow for dynamic pre-compression of data in a log memory system that enhances flush efficiency in a storage system. For example, storage system architecture normally persists data related to host write request, prior to acknowledging the request to the host, to prevent data loss in case of HA (High Availability) events and to improve the write request latency. This is normally done by journaling the data and the corresponding metadata to a log memory system, which is an "intermediate" media. Further processing and destaging of the data and metadata to the final storage location is done later in background flush flows. In some cases, storage systems with limited bandwidth to the log memory system, the log memory system becomes a bottleneck, limiting the system performance and causing CPU utilization inefficiencies.

Another problem is limited flush flow parallelism and utilization. For example, the maximum number of concurrent flushers is limited by the log memory system size, since each "flusher" fills an entire two megabyte blocks (e.g., physical large blocks (PLB)) with compressed data. As flushers are normally evenly assigned per flush CPU core, the problem becomes even more critical in systems with higher number of CPU cores. As a result, flush flow is not scalable and not able to fully utilize flush CPU cores, causing inefficiencies.

Implementations of the present disclosure provide a dynamic approach to increase the effective bandwidth to the log memory system with no or minimal latency impact, while increasing the effective log memory size by pre-compressing data persisted to the log memory system. In this manner, log memory compression process 10 eliminates log memory system limitations and increases the flush core parallelism, which improves the overall storage system performance and efficiency.

In some implementations, log memory compression process 10 may process 300 data to store in a storage system. For example, log memory compression process 10 may process a plurality of IO operations using the storage node. For example and referring also to FIG. 4, suppose a host (e.g., host 400) sends an IO request (e.g., IO request 402) to write data to a storage array (e.g., storage array 112) using a storage node (e.g., storage node 100). In this example, log memory compression process 10 may write the data (e.g., data 404) to the processing storage node (e.g., storage node 100). In some implementations, it will be appreciated that a read IO operation may be processed on the storage node (e.g., storage node 100). In some implementations, data may be stored in the storage system in predefined portion sizes or "pages". In one example, each page is four kilobytes (4 KB). In another example, each page is eight kilobytes (8 KB). However, it will be appreciated that the page size may be specifically defined (e.g., user-defined or automatically defined) for each storage system or application within the scope of the present disclosure.

In some implementations, log memory compression process 10 may compress 302 the data for storage in a log memory system based upon, at least in part, bandwidth of the storage system. Compression of data for storage generally includes reducing the number of bits needed to represent the data according to an algorithm or other methodology. In one example, an algorithm may represent a string of bits (e.g., "0s" and "1s") with a smaller string of zeroes and ones by using a dictionary for the conversion between them. The formula may also insert a reference or pointer to a string of zeroes and ones that the program has already seen. However, it will be appreciated that compression may be performed generally for all types of data using various compression algorithms.

As discussed above, storage system architecture normally persists data related to host write request, prior to acknowledging the request to the host, to prevent data loss in case of HA (High Availability) events and to improve the write request latency. This is normally done by journaling the data and the corresponding metadata to a log memory system. However, as data is added to the log memory system, the IO processing bandwidth from the storage node to the log memory system may be limited during heavy loads such that the log memory system becomes a bottleneck within the storage system. As such, log memory compression process 10 may compress 302 the data (or at least a portion of the data) for storage in the log memory system based upon, at least in part, the bandwidth of the storage system. As will be discussed in greater detail below, log memory compression process 10 may dynamically compress data or particular portions of data. For example, as opposed to simply compressing all log entries (e.g., pages in the log memory system), log memory compression process 10 may calculate the data compression using either the CPU of the storage system or using a separate processing unit (e.g., a hardware engine).

In some implementations, compressing 302 the data includes comparing 308 the bandwidth of the storage system to a bandwidth threshold. The bandwidth of a storage system is generally defined as the maximum rate of data transfer across a given path. In this example, the bandwidth of the storage system includes the bandwidth measured for storing data from a storage node to a log memory system within the storage node or elsewhere in the storage system. For example, log memory compression process 10 may receive a user-defined bandwidth threshold associated with the bandwidth measured for storing data within the log memory system. In another example, log memory compression process 10 may include a default bandwidth threshold and/or a dynamically determined bandwidth threshold for the storage node and/or log memory system. In some implementations, the bandwidth threshold may be a value that defines the threshold rate of data transfer from the storage node to the log memory system that indicates when the storing of data is or is not a bottleneck in the operation of the storage system. As will be discussed in greater detail below, when the bandwidth is low (e.g., below a predefined bandwidth threshold, log memory compression process 10 does not perform compression in order to avoid an IO latency increase (i.e., as compressing data before acknowledging the IO adds latency). In such cases, with low bandwidth, there is not a bottleneck issue between the storage node and the log memory system.

In some implementations, compressing 302 the data includes, in response to the bandwidth of the storage system being less than or equal to the bandwidth threshold, performing 310 no compression on the data. For example, suppose a storage system bandwidth (e.g., bandwidth defined for the path between storage node 100 and log memory system 406) is less than a predefined bandwidth threshold. In this example, because the bandwidth does not exceed the bandwidth threshold, performing compression on the data for storage in the log memory system may increase the IO latency. Accordingly, log memory compression process 10 performs 310 no compression on the data.

In some implementations, compressing 302 the data includes, in response to the bandwidth of the storage system being greater than the bandwidth threshold, compressing 312 the data based upon, at least in part, CPU utilization of the storage system. For example, when storage system bandwidth is sufficiently high, log memory compression process 10 may increase the effective storage system bandwidth by compressing the data (or at least a portion thereof) for storage in the log memory system. For example, suppose that log memory compression process 10 processes data 404 for storing in storage system 12. In this example, suppose that data 404 is a page being written to the storage system. Log memory compression process 10 may determine that the storage system bandwidth exceeds the bandwidth threshold. As such, it may require more bandwidth to store uncompressed data 404 versus compressed data (e.g., represented in FIG. 5 as data 404'). Accordingly, log memory compression process 10 may compress data 404 to generate compressed data 404' for storing in log memory system 406. In this manner, log memory compression process 10 may increase the effective bandwidth between storage node 100 and log memory system 406 by compressing data 404.

In some implementations, compressing 312 the data based upon, at least in part, CPU utilization includes comparing 314 the CPU utilization to a CPU utilization threshold. For example, the compression of data may be calculated either synchronously in CPU or asynchronously in a separate processing unit (e.g., a hardware engine). Accordingly, log memory compression process 10 monitors the CPU utilization of the IO cores (e.g., CPU cores responsible for processing host IO requests) to determine a CPU utilization for the storage system to determine which compression engine to use. In some implementations, log memory compression process 10 may compare 314 the CPU utilization to a CPU utilization threshold. For example, the CPU utilization may be a percentage or ratio of CPU utilization versus a maximum CPU utilization that represents the processing load being experienced by the CPU of the storage system. In some implementations, the CPU utilization threshold may be user-defined (e.g., via a user interface), a default value, and/or a value dynamically determined by log memory compression process 10. Log memory compression process 10 may iteratively or periodically compare 314 the CPU utilization to the CPU utilization threshold over time and/or may compare 314 the CPU utilization to the CPU utilization threshold in response to processing 300 data in the storage system as discussed above.

Figure 5:
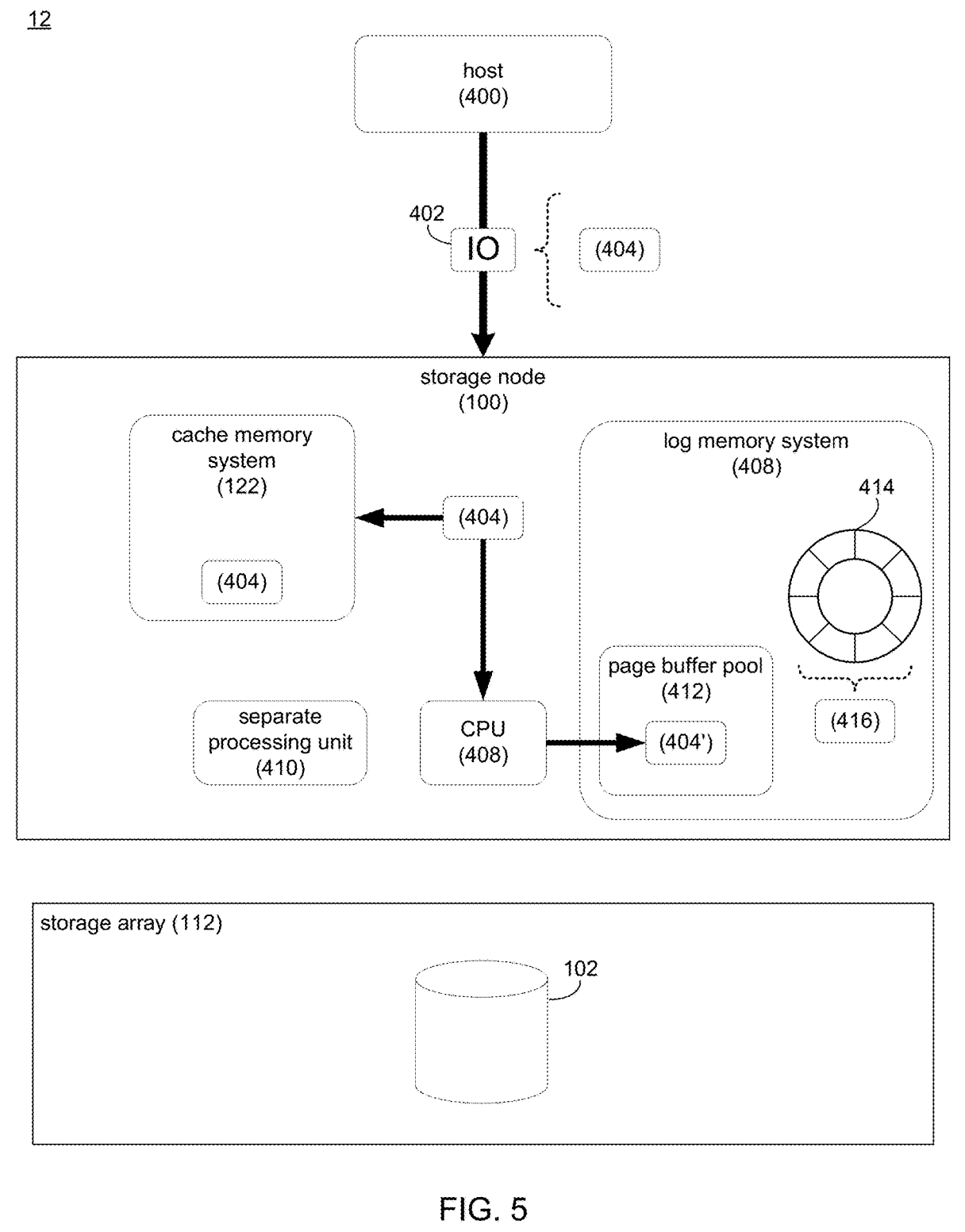

In some implementations, compressing 312 the data based upon, at least in part, CPU utilization includes, in response to the CPU utilization being less than or equal to the CPU utilization threshold, compressing 316 the data using a CPU of the storage system. For example, when the CPU utilization is below the CPU utilization threshold, the compression may be calculated by the CPU of the storage system, which will minimize the latency impact. In this manner, when the CPU has sufficient resources (e.g., in terms of CPU utilization relative to the CPU utilization threshold), log memory compression process 10 may compress XXX the data synchronously with the CPU of the storage system. Referring also to FIG. 5, log memory compression process 10 may compress 316 data 404 using a CPU (e.g., CPU 408) to generate compressed data (e.g., compressed data 404'). In some implementations, compressing 312 the data may include using one or more CPU cores of CPU 408 to compress 316 data 404 into compressed data 404'.

Figure 6:
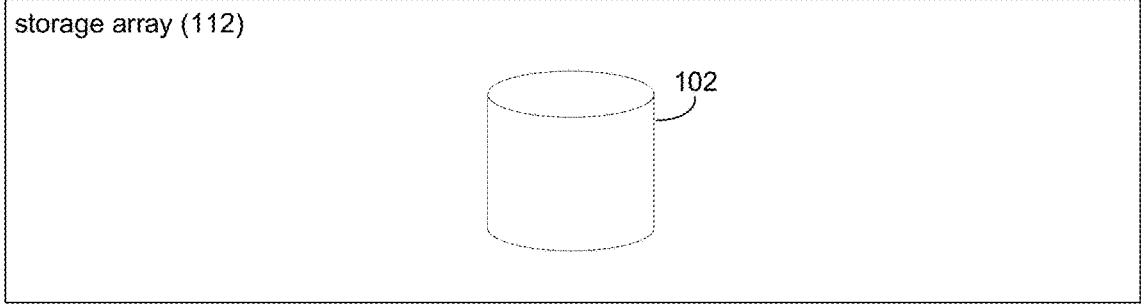

In some implementations, compressing 312 the data based upon, at least in part, CPU utilization includes, in response to the CPU utilization being greater than the CPU utilization threshold, compressing 318 the data using a separate processing unit. For example, when the CPU utilization is above the CPU utilization threshold, log memory compression process 10 may offload the compression of the data to a separate processing unit. For example, a separate processing unit may include a processing unit separate from the CPU. In one example, the separate processing unit may be a hardware engine. For instance, the separate processing unit may be an Intel® QuickAssist Adapter, which is a hardware engine that can be coupled to a storage node with cryptography acceleration and compression capabilities. It will be appreciated that various specialty or general processing units may be used to offload compression of the data from the CPU within the scope of the present disclosure. In some implementations, the CPU IO core(s) (i.e., core(s) used for IO request processing) may be utilized for processing other IO requests during the waiting time, which still provides performance improvement, but with a latency cost. Referring also to FIG. 6, log memory compression process 10 may compress 318 data 404 using a separate processing unit (e.g., separate processing unit 410) to generate compressed data (e.g., compressed data 404'). In some implementations, compressing 318 the data may include using one or more cores or sub-processing units or modules of separate processing unit 410 to compress 318 data 404 into compressed data 404'.

In some implementations, log memory compression process 10 may store 304 the compressed data in a log memory system. A log memory system may generally include one or more non-volatile random access memory (NVRAM) devices configured to provide a log of the data written to storage array. For example, the contents of the log memory system may be preserved in the event of a power failure or other failure of the cache memory system. In some implementations and in response to the failure of the cache memory system, log memory compression process 10 may recover data from the log memory system. For example and as will be discussed in greater detail below, the log memory system may include a page buffer pool (e.g., page buffer pool 412) and/or a page descriptor ring (e.g., page descriptor ring 414).

In some implementations, log memory compression process 10 may persist a plurality of pages in a plurality of page buffers within the page buffer pool based upon, at least in part, the processing of the plurality of IO operations. A page buffer is a portion of storage capacity within the page buffer pool. For example and in response to the failure of the cache memory system, log memory compression process 10 may recover data from the log memory system. Log memory compression process 10 may write the data (e.g., page 404) to a page buffer pool (e.g., page buffer pool 412) of a log memory system (e.g., log memory system 406). As discussed above, log memory compression process 10 may store 304 a compressed version of the data (e.g., compressed page 404') in log memory system 406. For example, log memory compression process 10 may store 304 compressed page 404' in a page buffer within page buffer pool 412.

In some implementations, log memory compression process 10 may store information concerning the data stored in the log memory system in a page descriptor. A page descriptor may generally include a reference or pointer to a page buffer that includes a logical address of the data the corresponding page buffer contains. The page descriptor may also include a sequence transaction number that tracks the order of write operations. Additionally, the page descriptor may include other types of information. In some implementations, log memory compression process 10 may store each page descriptor in a data structure. For example, log memory compression process 10 may store each page descriptor in a page descriptor ring buffer. As is known in the art, a ring buffer may allow data to be added to the "head" of the ring buffer and released or overwritten from the tail of the ring buffer. In this manner, the ring buffer may appear to be circular in that older data is overwritten with newer data. In some implementations, the page descriptor may be utilized to recover data during a restart or storage system failure. For example, page descriptors may be used to determine the order of page buffers to apply to recover a storage system.

In some implementations, data may be considered to be persisted when a page descriptor is generated. For example, once a page descriptor is stored in the log memory system, the content and order of a page buffer may be recovered during a storage system failure or restart. In some implementations, log memory compression process 10 may send an acknowledgment signal to the host device (e.g., host device 400) once the data (e.g., page 404) is persisted in non-volatile memory (e.g., log memory system 406). Specifically, once the page descriptor (e.g., page descriptor 416) is stored in the page descriptor ring (e.g., page descriptor ring 414).

In some implementations, with the above-described dynamic compression process, some pages in the log memory system may be compressed, while other page may be uncompressed. In order to support both configurations, log memory compression process 10 updates the page descriptor to maintain a "CompressionSize" field. For example, if the uncompressed page size is 4 KB, and the LBA (Logical Block Address) is in 512 B granularity, then process may use e.g., four bits for this field as follows: if the page is uncompressed, the "CompressionSize" field value will be 0xF, and if the page is compressed, the "CompressionSize" field will store the rounded-up page size in LBA granularity. In this manner, during recovery or other situation where a page descriptor is accesses, log memory compression process 10 may perform decompression on compressed data based upon, at least in part, the "CompressionSize" field of the page descriptor.

In some implementations, during "data cache miss" (e.g., servicing a read IO request from a different storage node or during recovery scenarios where the cache memory was lost), the "CompressionSize" field may be used as follows: if its vale is 0xF, then an uncompressed page will be read. Otherwise, the page may be read from the log memory system according to the "CompressionSize" value and decompress the page.

In some implementations, log memory compression process 10 may store 306 the data in a cache memory system in an uncompressed state. For example, by compressing and storing compressed data in the log memory system, while still keeping uncompressed data in the cache memory system. Therefore, data flows through the cache memory system remain the same, e.g., read requests are processed the same, not requiring decompression, while recovery flows (e.g., after restart where the cache memory is lost) include decompression of compressed pages.

In some implementations, log memory compression process 10 may flush a page from the page buffer; invalidate the page from a cache memory system; free the page buffer within the page buffer pool; and mark the page buffer as flushed. For example, at some point in time after writing the data to the cache memory system and data journal, data may be "flushed" or written from the cache memory system to the persistent memory of the storage array. Flushing a page buffer may include flushing a page descriptor-page buffer pair. When flushing a page, log memory compression process 10 may invalidate the page from the cache memory system. As is known in the art, invalidating an entry from the cache memory system includes replacing or removing entries of the cache memory system.

Referring again to FIG. 4 and at some point in time after writing the data (e.g., page 404) to cache memory system 122 and log memory system 406, page 404 may be "flushed" or written from cache memory system 122 to the persistent memory of the storage array (e.g., storage array 112). Page 404 may be invalidated in cache memory system 122 during the flushing. In response to invalidating the page from the cache memory system, log memory compression process 10 may free the page back to the page buffer pool (e.g., page buffer pool 412). For example, freeing the page buffer may include releasing the page buffer for writing and storing new data associated with a new IO write operation. In some implementations and in response to freeing the page buffer, log memory compression process 10 may mark the page buffer as flushed. In this manner, the page may be marked as flushed for a read IO operation.

In some implementations, flushing a page may include designating a "flusher" or portion of resources from the CPU for flushing the page from the log memory system. As discussed above, when flushing compressed pages from log memory system 406, log memory compression process 10 may allocate more flushers (e.g., as the number of flushers required to flush compressed pages may be greater than the number of flushers required to flush uncompressed pages). In this manner, log memory compression process 10 may improve flush efficiency by compressing pages in the log memory system.

Implementations of the present disclosure allow for the reduction of log memory system limitations, both in terms of size and bandwidth, since log memory compression process

10 writes compressed data. In some implementations, CPU core utilization may be improved since flush scalability and parallelism is increased. For example, as the effective log memory size is increased, more flushers may be issued concurrently to flush data from the log memory system to the storage array. Additionally, since the data is already compressed, the flush flows do need to wait for offloaded asynchronous hardware engine compression, which reduces the flush latency and serialization. Hence, flush cores may be better utilized, which significantly increases the flush rate, scalability, and efficiency of the storage system. Moreover, conventional approaches using separate processing units, e.g., hardware engines to perform compression during the flush stage cause bursts and hiccups, that increases the waiting time and reduces the CPU utilization. By contrast, performing compression synchronously using the CPU smooths the load on the separate processing unit and improves the storage system performance.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

processing data to store in a storage system;

compressing the data for storage in one or more pages of a log memory system based upon, at least in part, bandwidth of the storage system, wherein compressing the data includes:

comparing the bandwidth of the storage system to a bandwidth threshold, wherein the bandwidth of the storage system is a maximum rate of data transfer between a storage node in the storage system to the log memory system;

in response to the bandwidth of the storage system being greater than the bandwidth threshold, compressing the data synchronously using Central Processing Unit (CPU) based upon, at least in part, CPU utilization of the storage system, wherein compressing the data synchronously using the CPU based upon, at least in part, the CPU utilization includes iteratively comparing the CPU utilization to a CPU utilization threshold over time; and generating a page descriptor defining a compression size for a respective page of the one or more pages used to store the data in the log memory system, wherein the compression size is a field value in the page descriptor that is accessed during decompression to decompress the data;

storing the compressed data in a log memory system;

storing the data in a cache memory system in an uncompressed state; and processing the data during a data cache miss by processing the compression size from the page descriptor and selectively decompressing the compressed data from the log memory system using the compression size.

2. The computer-implemented method of claim 1, wherein compressing the data includes, in response to the bandwidth of the storage system being less than or equal to the bandwidth threshold, performing no compression on the data.

3. The computer-implemented method of claim 1, wherein compressing the data based upon, at least in part, CPU utilization includes, in response to the CPU utilization being less than or equal to the CPU utilization threshold, compressing the data using a CPU of the storage system.

4. The computer-implemented method of claim 1, wherein compressing the data based upon, at least in part, CPU utilization includes, in response to the CPU utilization being greater than the CPU utilization threshold, compressing the data using a separate processing unit.

5. A computer program product residing on a non-transitory computer readable medium having a plurality of instructions stored thereon which, when executed by a processor, cause the processor to perform operations comprising:

processing data to store in a storage system;

compressing the data for storage in one or more pages of a log memory system based upon, at least in part, bandwidth of the storage system, wherein compressing the data includes:

comparing the bandwidth of the storage system to a bandwidth threshold, wherein the bandwidth of the storage system is a maximum rate of data transfer between a storage node in the storage system to the log memory system;

in response to the bandwidth of the storage system being greater than the bandwidth threshold, compressing the data synchronously using Central Processing Unit (CPU) based upon, at least in part, CPU utilization of the storage system, wherein compressing the data synchronously using the CPU based upon, at least in part, the CPU utilization includes iteratively comparing the CPU utilization to a CPU utilization threshold over time; and generating a page descriptor defining a compression size for a respective page of the one or more pages used to store the data in the log memory system, wherein the compression size is a field value in the page descriptor that is accessed during decompression to decompress the data;

storing the compressed data in a log memory system;

storing the data in a cache memory system in an uncompressed state; and processing the data during a data cache miss by processing the compression size from the page descriptor and selectively decompressing the compressed data from the log memory system using the compression size.

6. The computer program product of claim 5, wherein compressing the data includes, in response to the bandwidth of the storage system being less than or equal to the bandwidth threshold, performing no compression on the data.

7. The computer program product of claim 5, wherein compressing the data based upon, at least in part, CPU utilization includes, in response to the CPU utilization being less than or equal to the CPU utilization threshold, compressing the data using a CPU of the storage system.

8. The computer program product of claim 5, wherein compressing the data based upon, at least in part, CPU utilization includes, in response to the CPU utilization being greater than the CPU utilization threshold, compressing the data using a separate processing unit.

9. A computing system comprising:

a memory; and a processor configured to process data to store in a storage system, wherein the processor is further configured to compress the data for storage in one or more pages of a log memory system based upon, at least in part, bandwidth of the storage system, wherein compressing the data includes: comparing the bandwidth of the storage system to a bandwidth threshold, wherein the bandwidth of the storage system is a maximum rate of data transfer between a storage node in the storage system to the log memory system, in response to the bandwidth of the storage system being greater than the bandwidth threshold, compressing the data synchronously using Central Processing Unit (CPU) based upon, at least in part, CPU utilization of the storage system, wherein compressing the data synchronously using the CPU based upon, at least in part, the CPU utilization includes iteratively comparing the CPU utilization to a CPU utilization threshold over time, and generating a page descriptor defining a compression size for a respective page of the one or more pages used to store the data in the log memory system, wherein the compression size is a field value in the page descriptor that is accessed during decompression to decompress the data, wherein the processor is further configured to store the compressed data in a log memory system, wherein the processor is further configured to store the data in a cache memory system in an uncompressed state, and wherein the processor is further configured to process the data during a data cache miss by processing the compression size from the page descriptor and selectively decompressing the compressed data from the log memory system using the compression size.

10. The computing system of claim 9, wherein compressing the data includes, in response to the bandwidth of the storage system being less than or equal to the bandwidth threshold, performing no compression on the data.

11. The computing system of claim 9, wherein compressing the data based upon, at least in part, CPU utilization includes, in response to the CPU utilization being less than or equal to the CPU utilization threshold, compressing the data using a CPU of the storage system.

* * * * *